United States Patent
Huber et al.

(10) Patent No.: US 11,807,293 B2
(45) Date of Patent: Nov. 7, 2023

(54) ADJUSTMENT DRIVE FOR A STEERING COLUMN, AND STEERING COLUMN FOR A MOTOR VEHICLE

(71) Applicants: thyssenkrupp Presta AG, Eschen (LI); thyssenkrupp AG, Essen (DE)

(72) Inventors: Sebastian Huber, Goefis (AT); Jean-Pierre Specht, Haag (CH); Tim Bayer, Luechingen (CH)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 86 days.

(21) Appl. No.: 17/438,292

(22) PCT Filed: Mar. 11, 2020

(86) PCT No.: PCT/EP2020/056475
§ 371 (c)(1),
(2) Date: Sep. 10, 2021

(87) PCT Pub. No.: WO2020/182868
PCT Pub. Date: Sep. 17, 2020

(65) Prior Publication Data
US 2022/0177022 A1    Jun. 9, 2022

(30) Foreign Application Priority Data

Mar. 12, 2019 (DE) ..................... 10 2019 203 363.6

(51) Int. Cl.
*B62D 1/181* (2006.01)
*B62D 1/19* (2006.01)

(52) U.S. Cl.
CPC ............. *B62D 1/181* (2013.01); *B62D 1/195* (2013.01)

(58) Field of Classification Search
CPC ................................ B62D 1/181; B62D 1/195
See application file for complete search history.

(56) References Cited

U.S. PATENT DOCUMENTS 4,967,618 A * 11/1990 Matsumoto ............ B62D 1/181
280/775
5,306,032 A 4/1994 Hoblingre et al.
(Continued)

FOREIGN PATENT DOCUMENTS

| CA | 2090937 A1 | 9/1993 |
|---|---|---|
| CA | 2498799 A1 | 6/2005 |

(Continued)

OTHER PUBLICATIONS

English Translation of International Search Report Issued in PCT/EP2020/056475 dated Jun. 22, 2020.

*Primary Examiner* — Drew J Brown
(74) *Attorney, Agent, or Firm* — thyssenkrupp North America, LLC

(57) ABSTRACT

An adjustment drive for a steering column for a motor vehicle may include a housing that is able to be connected to the steering column, in which a gear wheel that is able to be rotatingly driven by a motor is mounted in a bearing assembly so as to be rotatable about a spindle axis, and on which a threaded spindle that engages in a spindle nut is axially supported in a direction of the spindle axis. To enable less complexity in manufacturing and assembling, an energy absorbing installation is disposed between the threaded spindle and the housing. When repositioning the threaded spindle relative to the housing in the direction of the spindle axis, the energy absorbing installation is configured to absorb kinetic energy.

17 Claims, 9 Drawing Sheets

(56) References Cited

U.S. PATENT DOCUMENTS

| | | | |
|---|---|---|---|
| 10,654,509 B2* | 5/2020 | Huber | B62D 1/185 |
| 11,091,188 B2* | 8/2021 | Specht | F16C 33/588 |
| 11,407,437 B2* | 8/2022 | Huber | B62D 1/195 |
| 2001/0011486 A1 | 8/2001 | Glinowiecki | |
| 2006/0163861 A1 | 7/2006 | Higashino | |
| 2009/0033082 A1 | 2/2009 | Klukowski | |
| 2019/0315391 A1* | 10/2019 | Illés | B62D 5/0403 |
| 2021/0039706 A1 | 2/2021 | Schmidt | |

FOREIGN PATENT DOCUMENTS

| | | |
|---|---|---|
| CA | 2920158 A1 | 8/2016 |
| DE | 198 29 238 A1 | 1/1999 |
| DE | 198 19 713 A1 | 11/1999 |
| DE | 10 2006 020 650 B3 | 8/2007 |
| DE | 10 2018 204 735 A1 | 10/2018 |
| DE | 10 2017 213 312 A1 | 2/2019 |
| EP | 1 544 075 A1 | 6/2005 |
| JP | 2007008266 A | 1/2007 |
| JP | 5900118 B | 10/2013 |
| WO | 2018/138044 A1 | 8/2018 |
| WO | 2020182868 A1 | 9/2020 |

* cited by examiner

ADJUSTMENT DRIVE FOR A STEERING COLUMN, AND STEERING COLUMN FOR A MOTOR VEHICLE

CROSS REFERENCE TO RELATED APPLICATIONS

This application is a U.S. National Stage Entry of International Patent Application Serial Number PCT/EP2020/056475, filed Mar. 11, 2020, which claims priority to German Patent Application No. DE 10 2019 203 363.6, filed Mar. 12, 2019, the entire contents of both of which are incorporated herein by reference.

FIELD

The present disclosure generally relates to steering columns, including adjustment drives for steering columns.

BACKGROUND

A steering column for a motor vehicle has a steering shaft with a steering spindle, at the rear end of which in the direction of travel, which faces the driver, a steering wheel is attached for introducing a steering command by the driver. The steering spindle is mounted so as to be rotatable in a casing unit, the latter conjointly with said steering spindle forming an actuator unit. The casing unit is held by a support unit which is fastened to the vehicle body. By adjusting the casing unit relative to the support unit, adjustable steering columns enable the steering wheel position to be set relative to the vehicle body. For the longitudinal adjustment it is known for the steering column to be designed so as to be adjustable in the longitudinal direction, that is to say in the direction of the longitudinal axis, so as to set the spacing from the driver's position. For the height adjustment, the steering spindle can be adjusted transversely to the longitudinal axis so as to set the height position of the steering wheel.

For adjusting the actuator unit relative to the support unit it is known in the prior art for a motorized adjustment drive to be provided, said adjustment drive having a drive unit which comprises an electric motor which, typically by way of a gearbox, is connected to a spindle drive which comprises a threaded spindle screwed into a spindle nut. By way of the drive unit, the threaded spindle and the spindle nut are able to be rotatingly driven counter to one another about an axis, specifically the spindle (threaded spindle axis), as a result of which the threaded spindle and the spindle nut can be moved in a translatory manner toward one another or away from one another, depending on the direction of rotation. In one embodiment, the threaded spindle is able to be rotatingly driven about the threaded spindle axis thereof by the drive unit, the latter having a housing that is connected in a stationary manner to a first steering column component, for example the actuator unit or the support unit, and engages in the spindle nut which, so as to be stationary in terms of the rotation about the threaded spindle axis, is attached to a second steering column component, for example to the support unit or alternatively to the actuator unit, that is adjustable relative to the first steering column component. The threaded spindle in the direction of the spindle axis is supported on the first steering column component, and the spindle nut is supported on the second steering column component, such that a rotating drive of the threaded spindle has the effect of a translatory adjustment of the two steering column components relative to one another in the direction of the spindle axis. This embodiment is referred to as a rotational spindle drive.

In an alternative embodiment, the threaded spindle in terms of rotation about the spindle axis thereof is coupled in a non-rotatable manner to the second steering column component, and the spindle nut is able to be rotatingly driven but in axial terms, in the direction of the spindle axis, is mounted so as to be stationary on the first steering column component and able to be rotatingly driven by the motor. As in the first embodiment, the threaded spindle is axially supported on the one steering column component, and the spindle nut is correspondingly supported on the other steering column component such that the steering column components are displaceable relative to one another in a translatory manner in that the spindle nut is rotatingly driven by the drive unit. This embodiment is referred to as an immersion spindle drive.

In order for a longitudinal adjustment of the actuator unit in the direction of the longitudinal axis of the steering spindle to be implemented, the spindle drive can be disposed between the actuator unit and a casing unit that receives the latter in an axially longitudinally displaceable manner and is connected to the support unit, also referred to as a guide box or a boxed swing arm, and wherein the spindle axis can be aligned so as to be substantially parallel to the longitudinal axis. In order for the height to be adjusted, a spindle drive can be disposed between the support unit and an actuator unit or casing unit which is mounted so as to be height adjustable on said support unit and in which the actuator unit is received. A motorized longitudinal adjustment or height adjustment can be configured individually or in combination on a steering column.

Driving the spindle drive takes place by the drive unit by way of a gear wheel which is able to be rotatingly driven about the axis of said gear wheel, the latter being identical to the spindle axis, and which is connected in a rotationally fixed manner to the spindle nut or to the threaded spindle, depending on the embodiment of the spindle drive. The gear wheel is mounted so as to be rotatable and axially supported in the housing and can have a toothed portion in the form of a spur gear having an externally encircling toothing or a worm splining, a drive wheel, for example a worm, connected to the motor engaging said toothing or worm splining. The gear wheel is mounted in a bearing assembly in the housing, as a result of which the retaining and adjusting forces acting on the spindle drive in both axial directions of the spindle axis on the gear wheel are transmitted by way of the gear wheel to the housing and from there ae supported on the actuator unit, the casing unit or the support unit.

As an effective measure for improving passenger safety in a vehicle crash, the so-called event of a crash, in which the driver impacts the steering wheel at a high velocity, it is known for the steering column to be designed so as to be collapsible in the longitudinal direction when a force that exceeds a limit value arising only in the event of a crash is exerted on the steering wheel. In order to ensure a controlled deceleration of the body impacting the steering wheel, an energy-absorbing installation, also referred to as a crash installation, is interposed between the steering column components that are adjustable relative to one another, for example the external casing and the actuator unit, the two latter in the normal operation being positioned relative to one another in the set adjustment position. Said energy-absorbing installation converts the kinetic energy introduced into the actuator unit in the longitudinal direction by way of the steering wheel into a plastic deformation of an energy-absorbing element, for example by tearing open a tear-away lug or by bending an elongate bending element, for instance a bending wire or a bending strip.

A steering column in which an energy-absorbing installation is disposed between the spindle drive and the steering column components that are adjustable relative to one another is known from DE102018204735A1, said steering column in the event of a crash being able to absorb the kinetic energy arising in a movement of the spindle drive in the direction of the spindle axis. The energy-absorbing installation here is incorporated between the housing or the threaded spindle and one of the steering column components. This assembly is effective but does require a relatively high complexity in terms of manufacturing and assembling.

Thus a need exists for an improved adjustment drive which enables less complexity in terms of manufacturing and assembling.

DETAILED DESCRIPTION

Figure 1:
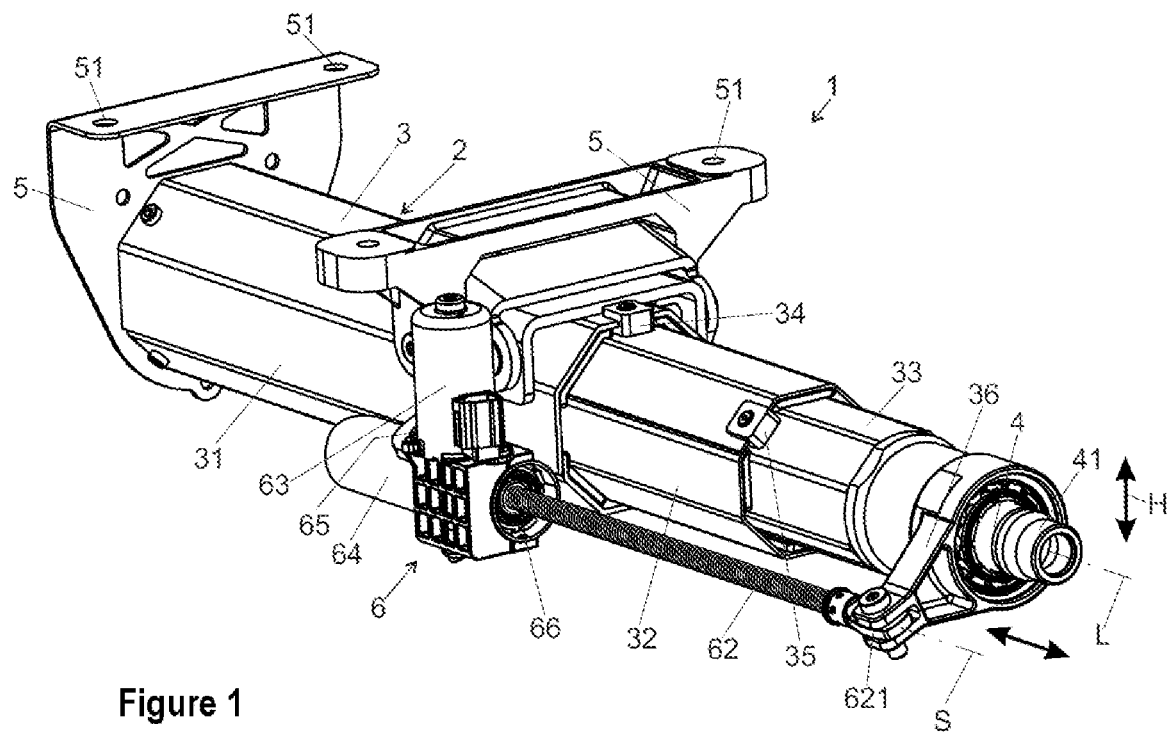
FIG. 1 is a schematic perspective view of an example steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to an adjustment drive for a steering column for a motor vehicle. In some examples, an adjustment drive may comprise a housing that is able to be connected to the steering column, in which a gear wheel that is able to be rotatingly driven by a motor is mounted in a bearing assembly so as to be rotatable about a spindle axis, and on which a threaded spindle that engages in a spindle nut is axially supported in the direction of the spindle axis. A steering column having an adjustment drive of this type is likewise the subject of the present disclosure.

In an adjustment drive for a steering column for a motor vehicle, comprising a housing (drive housing) which is able to be connected to the steering column, in which a gear wheel that is able to be rotatingly driven by a motor is mounted in a bearing assembly so as to be rotatable about a spindle axis, and on which a threaded spindle that engages in a spindle nut is axially supported in the direction of the spindle axis, wherein the housing has a connection element, it is proposed according to the invention that an energy-absorbing installation is disposed between the threaded spindle and the housing which, when repositioning the threaded spindle relative to the housing in the direction of the spindle axis, is configured for absorbing kinetic energy.

The housing preferably has a connection element which is configured in a manner to connect the housing to a first steering column component of a steering column so that the housing is supported in the direction of the spindle axis. Furthermore, the threaded spindle is able to be connected to a second steering column component so as to be supported in the direction of the spindle axis, said second steering column component being adjustable relative to the first steering column component in the direction of the spindle axis.

The adjustment drive has a housing which is configured as a drive housing and in which the gear wheel is mounted, and to which the motor for forming a complete drive unit is preferably fixedly attached. The housing by means of the connection element can be established on one of the steering column components that are adjustable relative to one another so as to be axially supported, that is to say supported in the direction of the spindle axis. The energy absorbing installation in the event of a crash ensures a controlled deceleration of a relative movement between the threaded spindle and the housing in the direction of the spindle axis, by converting kinetic energy into frictional heat and deformation work. As a result of the energy-absorbing installation being integrated in the housing in accordance with the invention, the adjustment function and additionally the energy-absorbing function can be combined in a space-saving manner in a compact drive unit of the adjustment drive.

In comparison to the prior art, which requires the energy-absorbing installation between the adjustment drive and a steering column component to be separately provided and assembled, the adjustment drive according to the invention can be assembled on the steering column with less complexity. An advantageous design embodiment requiring less installation space can be implemented here.

The gear wheel for forming an immersion spindle drive can be connected in a rotationally fixed manner to the spindle nut, wherein the gear wheel comprises the spindle nut or is fixedly connected to the latter. Alternatively, the gear wheel for forming a rotational spindle drive can be connected in a rotationally fixed manner to the threaded spindle.

The threaded spindle is preferably formed from metallic material and formed from a solid matter, that is to say from a solid material, such that a particularly stable threaded spindle which is not deformed during the event of a crash, thus endures the event of the crash without deformation, can be provided.

The energy-absorbing installation can have an energy-absorbing element which has a friction element (frictional element) and/or a deformation element. The energy-absorbing element can preferably be disposed in the housing, in the force flux between the housing and the threaded spindle, such that said energy-absorbing element is plastically deformed in an axial movement of the threaded spindle relative to the housing, and alternatively or additionally converts kinetic energy into frictional heat. It is advantageous here for the energy-absorbing element in the housing of the adjustment drive to be protected in relation to potentially harmful external influences, the functional reliability and thus the protection of passengers being enhanced as a result thereof. The assembly here is simplified in comparison to the prior art.

One advantageous embodiment provides that the energy-absorbing installation interacts with the bearing assembly and the housing. In the normal operation, the bearing assembly transmits the adjustment force between the threaded spindle and the housing, and in the event of a crash the force of the crash, which from the threaded spindle is introduced into the bearing assembly by way of the gear wheel, correspondingly acts in the axial direction between the bearing assembly and the housing. An energy-absorbing element of the energy-absorbing installation can be disposed in the housing so as to in the direction of the spindle axis be between the bearing assembly and the housing. In the normal operation, the gear wheel is held axially in the operating position thereof in the bearing assembly. In the event of a crash, the bearing assembly yields in the axial direction and releases the gear wheel including the threaded spindle so as to reposition in the direction of the crash force acting axially thereon, whereby the energy-absorbing installation responds by deforming the energy-absorbing element between the bearing assembly and the housing in order to absorb energy, and/or is moved while generating friction. It is an advantage here that the bearing assembly can be guided in the axial direction in the housing, and the energy-absorbing installation can be optimized with a view to decelerating in a controlled manner the bearing assembly relative to the housing, said bearing assembly moving only in the event of a crash.

It is possible for the housing in the direction of the spindle axis to be configured so as to be tubular, wherein the bearing assembly is received so as to be coaxial in the housing. The interior space of the housing in axial terms can extend so as to be coaxial with respect to the spindle axis. The bearing assembly can be disposed in the interior space and during the normal operation be axially fixed. In the event of a crash, the bearing assembly can be moved in the direction of the crash force into the interior space, while absorbing energy axially along a predefined crash path, the absorption of energy by friction and/or deformation being able to take place within said crash path. It is advantageous here that the bearing assembly in the event of a crash is guided in the housing such that a controlled deceleration can be readily implemented. The energy-absorbing element or energy-absorbing elements in the housing is/are protected in relation to external influences.

One advantageous embodiment of the invention is that a retaining element is disposed between a thrust bearing element of the bearing assembly and the housing. The retaining element is fixed in the axial direction to the housing and ensures that a thrust bearing element of the bearing assembly is kept in position during the normal operation. The thrust bearing element serves for axially supporting the bearing assembly and thus the gear wheel in the bearing assembly. The forces that are transmitted by way of the threaded spindle to the gear wheel, and from the latter to the bearing assembly, are supported axially in relation to the housing by way of the retaining element. The retaining element makes available a defined axial retaining force for the bearing assembly, said retaining force not being exceeded in the normal operation so that the thrust bearing element, and thus the bearing assembly, remain in the operating position. When the retaining force is exceeded in the event of a crash, the connection between the retaining element and the housing is released, and the thrust bearing element, including parts of the bearing assembly that are no longer supported in this instance and the gear wheel and the threaded spindle connected to the latter, can move axially relative to the housing, i.e. in the direction of the crash force.

Apart from fixing the bearing assembly in the normal operation, the retaining element can advantageously be configured for absorbing energy, as will be explained hereunder.

It is possible for the retaining element to have an energy-absorbing element. For example, the retaining element can have a friction element which for mounting the bearing assembly is connected in a force-fitting manner to the housing. When the retaining force effected by the former is a exceeded by the crash force, the latter in the event of a crash being higher, the retaining element moves relative to the housing, and kinetic energy is absorbed in the friction-fit of the connection. The retaining element can have a contact portion that is braced in relation to the housing; for example, an annular, coaxially disposed retaining element can have a friction portion which from the inside is radially braced in a friction-fitting manner in relation to the internal wall of a tubular internal space of the housing. Additionally or alternatively, the contact portion can have a form-fit portion which is braced in a form-fitting manner. The retaining element is axially supported on the housing by way of the contact portion or contact portions.

The retaining element can furthermore have one deforming or forming element or a plurality of deforming or forming elements, which is/are disposed between the bearing assembly and the housing. In a relative movement caused by the crash force, an absorption of energy likewise takes place by way of plastic deformation.

It can be advantageous for the retaining element to have a spring element which is able to be elastically braced in relation to the housing. The spring element can have, for example, a flexible tongue, a leaf spring or the like, by way of which a contact portion is preloaded in relation to the housing. A defined retaining force can be generated between the contact portion and the housing by way of a friction-fit in the normal operation, and a defined friction force in a relative movement can be generated in the event of a crash.

Additionally or alternatively, a retaining element can be held in a spring-loaded form-fit on the housing, said spring-loaded form-fit being released by the crash force in the event of a crash.

At least one spring element can preferably be configured so as to be integral to the retaining element, said spring element preferably potentially being configured as a formed wire part or formed sheet-metal part of steel or spring steel. A friction-fit and/or form-fit element for connecting to the housing can likewise preferably be configured so as to be integral to the retaining element, for example in the form of a contact element with a profiled feature or a retaining spine which is pressed against the housing and herein can generate a force-fitting and/or form-fitting connection by friction and/or local deformation.

In one advantageous refinement it can be provided that the retaining part, when repositioning in relation to the housing, severs a chip from the housing and energy is thus absorbed as a result of the severing operation. Alternatively or additionally, a separating element such as, for example, a planer, which is supported on the retaining element in such a manner that said planer in the event of a crash is repositioned in relation to the housing and severs a chip from the housing can also be provided.

One advantageous refinement of the invention can provide that the thrust bearing element has a forming die which interacts with the retaining element and has at least one forming portion.

The thrust bearing element by way of one side is directed axially toward the bearing assembly and supports, for example, a bearing ring, or can be connected to a bearing ring, or per se be configured as a bearing ring, for example be configured having a rolling member raceway as a bearing ring of a roller bearing for mounting the gear wheel. The forming die on the side thereof that faces away axially from the bearing assembly is directed toward the retaining element. In the event of a crash, the crash force, which is counter to the retaining force acting between the retaining element and the housing, is exerted in the axial direction from the threaded spindle to the bearing assembly. As a result, the thrust bearing element together with the forming element of the forming die is pressed against the retaining element, as a result of which the retaining element can be deformed while absorbing energy. The forming portion can have a bending edge about which the retaining element is bent, for example.

The thrust bearing element is preferably formed from in a metallic material and has a higher degree of stiffness than the retaining element.

A refinement can provide that the retaining element has a first forming portion and at least one second forming portion spaced apart from the former, wherein the first forming portion and the second forming portion are configured such that the retaining element, upon a first forming about the first forming portion, in a second forming is able to be formed about the second forming portion. The second forming portion in terms of the spindle axis can be disposed so as to be radially offset outward relative to the first forming portion and axially so as to be disposed toward the bearing assembly, that is to say in a corresponding manner in the direction of the spindle axis disposed so as to be remote from the retaining element. In the first forming, the retaining element is bent on the first forming portion until said retaining element comes into contact with the second forming portion and on the latter can be further deformed in a second forming. A plastics and/or elastic deformation, for example bending, can in each case take place in the first forming and the second forming, wherein energy can be absorbed in each case. Additionally, the force which by way of the contact portion is exerted on the housing can be varied by the forming actions such that the contact portion is pressed against the housing by way of a greater force after the second forming, for example, as a result of which the friction force which in the event of a crash opposes a relative movement of the retaining element and the housing is increased. As a result, a progressively increasing absorption of energy can be implemented such that a correspondingly increasing braking effect can be generated in the event of a crash.

The aforementioned embodiment can be implemented in that the thrust bearing element has a retaining portion which, inclined in relation to the thrust bearing element, extends from the first forming portion up to the contact portion, and the retaining portion has at least one sub-portion which is able to be formed about the second forming portion in relation to the thrust bearing element so as to extend in a more inclined manner from the second forming portion up to the contact portion. A retaining portion can have, for example, a flexible tongue which in terms of the spindle axis is directed radially outward, a contact portion which for fixing the retaining element is elastically braced in relation to the housing being situated on the outer end region of said flexible tongue. A plurality of contact portions of this type can preferably be disposed in a radial manner and be configured so as to be inherently spring-elastic, for example as flexible tongues which, configured from spring steel sheet, are integral to the retaining element. After the first forming, a retaining portion as a result of the friction force acting between the contact portion and the housing is further formed in the direction toward the forming die of the thrust bearing element and inclined in relation to the spindle axis until said retaining portion contacts the second forming portion. The retaining portion at the second forming portion is formed and increasingly bent toward the thrust element in such a manner that the sub-portion between the second forming portion and the contact portion bearing on the housing is more inclined in relation to the spindle axis than between the first forming portion and the second forming portion. The sub-portion forms a shortened flexible tongue which exerts an increased spring force in a radially outward manner. As a result, an increased elastic bracing of the retaining element in the housing, and thus an increasing energy-absorbing effect and braking effect, are generated. Thanks to this measure, a progressive crash characteristic can be implemented in a force/path diagram.

It can be provided that the retaining element is configured as a retaining ring, and the thrust bearing element is configured as a thrust bearing ring, wherein the first forming portion and the second forming portion at least in portions are configured as bending edges which are axially directed toward the retaining ring and are encircling in the circumferential direction and directed toward the retaining ring. The retaining ring is disposed so as to be coaxial with the spindle axis and can preferably have a circular external circumference on which contact elements which are braced radially from the inside in relation to the internal wall of the tubular housing are disposed at least in portions. In the normal operation, the retaining ring fixes the bearing assembly in the housing by way of a friction-fit and/order form-fit. In the event of a crash, the retaining ring is axially displaced in the housing, wherein energy is absorbed by friction as a result of the contact with the housing. Additionally or alternatively, an absorption of energy can take place by plastic deformation, for example by deformation of the retaining element.

It is possible for the retaining element to be able to be elastically folded from a shape inclined away from the thrust bearing element to a shape inclined toward the thrust bearing element. In the normal operating position, the retaining element can be formed in such a manner that, when viewed from the thrust bearing element, said retaining element in the region of a contact portion on the external circumference thereof bears on the housing at an acute angle, thus <90°. For example, the retaining element can comprise a conical annular disk in the shape of a tapered sleeve which conically widens in the direction away from the thrust bearing element and by way of contact elements on the external circumference of said annular disk bears on the internal wall of the tubular housing. The thrust bearing element bears axially on the conical annular disk in the interior of the peripheral region. In this arrangement, a stable support of the bearing assembly takes place in which an axial support load exerted by the thrust bearing on the retaining element forces the inclined periphery of the retaining element radially toward the housing, and as a result ensures bracing in the fashion of a barbed book, so to speak. When the force exerted on the tapered sleeve in the event of a crash exceeds a predefined limit value, the inner peripheral region is pushed by the thrust bearing element axially through the external circumference fixed to the housing, wherein the conical annular disk is elastically everted such that the tapered sleeve shape now widens in the axially opposite direction, toward the thrust bearing, in other words is folded back toward the thrust bearing element. When viewed from the thrust bearing element, the retaining element now bears on the housing at an obtuse angle, thus >90°. As a result, the axial retaining force is reduced in comparison to the initial shape that is inclined away from the thrust bearing element, such that the retaining element for absorbing energy can be displaced relative to the housing along the crash path, counter to the friction force. It can be ensured by way of the required threshold value of the force, that the retaining element is folded over only in the event of a crash as a result of the high crash force arising thereby, and the energy-absorbing installation is also activated only in this instance. Thanks to this measure, a breakaway force peak can thus be implemented in a simple manner such that a shear-off element can be dispensed with if desired. The retaining element can be shaped and dimensioned such that said retaining element is not folded back by the actuating forces acting on the threaded spindle and the gear wheel in normal operation, and said retaining element thus only fixes the bearing assembly in the operating position and the energy-absorbing installation remains non-loaded.

One advantageous configuration provides that the housing has an internal cross section that converges so as to taper in the direction of the spindle axis. When viewed from the gear wheel, the internal cross section converges in the axial direction pointing away from the threaded spindle, in other words in the direction of a crash force which by way of the threaded spindle is introduced into the bearing assembly, said direction thus pointing toward the housing when viewed from the threaded spindle. In the case of a round cross section, the tubular housing, when viewed from the bearing assembly, can converge in a conical manner. In the event of a crash, the bearing assembly and, to the extent present, also the bearing ring, the thrust bearing ring and the retaining ring, can be compressed into the conically converging cross section. As a result of the crash path covered by the threaded spindle to the housing through the narrowing cross section during the crash, the friction in relation to the internal wall of the housing steadily increases such that a progressively increasing absorption of energy and a progressively increasing braking effect is generated. An energy-absorbing characteristic can be predefined by the shape of the constriction. The converging internal cross section can be formed, for example by beads which are molded into the housing from the outside, wherein said beads on the internal wall of the housing form inwardly projecting protrusions, wherein the height of the protrusions at different positions may vary, wherein the protrusions preferably extend in the direction of the spindle axis. It is however also conceivable for the converging cross section in the housing to be formed by another forming operation.

A conically converging housing can be implemented by way of a bearing ring and/or retaining ring and/or thrust bearing ring with a consistent predefined cross section or diameter, respectively. Likewise an advantageous combination can be implemented by way of a retaining element which is deformable by the thrust bearing element by means of a forming die.

The housing can have at least one slot that extends in the direction of the spindle axis, or have at least a partial variation in terms of the wall thickness. As a result, the friction force between the housing and the retaining element or the bearing assembly, respectively, and/or a force required for the plastic and/or elastic deformation of the housing, can be predetermined. The energy-absorbing characteristic can be predefined as a result thereof.

Diverse possibilities for implementing an appropriate absorption of energy by friction and deformation within the adjustment drive by way of a design of the housing in the interaction of the latter with the elements of the bearing assembly, and in combination with plastically deformable and/or mutually grinding energy-absorbing elements are derived from the invention.

It can be provided that the energy-absorbing installation has a bending and/or tear-away lug. Bending lugs or wires which can absorb energy by plastics bending, and tear-away lugs which are severed while absorbing energy, as well as combined bending/tearing elements as energy-absorbing elements are known in the prior art. According to the invention, the latter can be advantageously integrated in the adjustment drive, for example in that said bending/tearing elements are incorporated between the housing and the gear wheel, or the bearing assembly. It is conceivable and possible herein for a bending or tear-away lug to be configured so as to be integral to the housing, for example as part of the tubular wall of a tubular housing. As a result, installation space and weight can be saved.

In one advantageous refinement it can be provided that the energy-absorbing installation has at least one first bending and/or tear-away lug and one second bending and/or tear-away lug, wherein a coupling device that couples the first bending and/or tear-away lug and/or the second bending and/or tear-away lug to the force flux or decouples them from the force flux is provided, such that in the event of a crash only the first bending and/or tear-away lug is deformed or only the second bending and/or tear-away lug is deformed, or the first bending and/or tear-away lug and the second bending and/or tear-away lug are deformed, or none of the bending and/or tear-away lugs are deformed. Four different crash levels can thus be defined in a simple manner. The coupling device can, for example, be configured as a pyrotechnic switch, as a lifting solenoid switch, or the like. It is only relevant that the coupling device is configured in such a manner that the respective bending and/or tear-away lug is coupled into the force flux and/or decoupled therefrom.

A potential embodiment of the invention provides that the energy-absorbing installation has a hollow member which is coaxial with the spindle axis and is plastically compressible axially in the direction of the spindle axis. The hollow member serves as an energy-absorbing element and can be configured as tube which coaxially surrounds the threaded spindle and is axially plastically compressible. The tube can preferably be configured as a corrugated tube having one or a plurality of radial concave moldings in the form of beads which preferably fully or partially encircle the circumference. A corrugated tube of this type has an axial deformation behavior which is able to be adapted and predetermined within wide limits by way of the shape, disposal, number and material thickness of the concave moldings. The hollow member can be supported between the bearing assembly and the housing, wherein the threaded spindle in the case of an immersion spindle drive, in the converged state of the adjustment drive, can plunge into the hollow member, as a result of which a compact assembly can be implemented.

One advantageous refinement provides that the housing comprises the hollow member. The housing here can be configured so as to be tubular in order to coaxially receive the bearing assembly, and at least one sub-portion of the tubular housing can be, preferably integrally, configured as a corrugated tube. The hollow member can preferably be disposed between the bearing assembly and the connection element of the housing. It is advantageous here that the housing per se serves as an energy-absorbing element as a result of which a reduction in terms of mass, installation space and assembling complexity can be achieved.

A predetermined breaking element can preferably be disposed between the threaded spindle and the housing. The predetermined breaking element can be a shear pin, a rivet or the like, which breaks only at the high forces arising in the event of a crash and for absorbing energy releases a relative repositioning of the components of the energy-absorbing installation. For example, the bearing assembly, the gear wheel and/or the threaded spindle in the normal operation can be fixed relative to the housing in the axial direction by a predetermined breaking element.

The housing has a connection element which is specified and configured for connecting the housing to a first steering column component so as to be supported in the direction of the spindle axis. The connection element preferably has a form-fitting element, for example one or a plurality of studs or protrusions which project outward from the housing, or openings, shoulders or depressions which can be connected to corresponding connection means on a casing unit or a support unit of a steering column. The threaded spindle likewise has a connection element by way of which said threaded spindle is able to be connected to a second steering column component of the steering column so as to be supported in the direction of the spindle axis, said second steering column component by way of the adjustment drive being able to be adjusted relative to the first steering column component in the direction of the spindle axis, said connection element being, for example, a telescopically adjustable casing tube.

The invention furthermore relates to a steering column comprising a first steering column component and a second steering column component which in the direction of a spindle axis are adjustable relative to one another, and having an adjustment drive which has a drive unit which by way of a connection means is able to be attached to the first steering column component and is able to be supported in the direction of the spindle axis, and a threaded spindle which on the drive unit is supported in the direction of the spindle axis and able to be attached to the second steering column component and able to be supported axially in the direction of the spindle axis. It is provided according to the invention that the adjustment drive is configured according to one or a plurality of the embodiments described above.

The use is advantageous in a steering column in which the steering column components comprise at least three casing tubes which in the direction of the steering column axis are adjustable relative to one another. A multi-telescopic steering column of this type has a particularly large relative adjustment path between the maximum converged state and the maximum diverged state. Therefore, said steering column is particularly suitable as a steering column which can be stowed away during autonomous driving. A compact construction associated with a large adjustment path and a high operational reliability can be implemented as a result of the adjustment drive according to the invention with an integrated energy-absorbing installation.

FIG. 1 shows a steering column 1 according to the invention which has an actuator unit 2 in a view which in terms of the travel direction is from obliquely behind. The actuator unit 2 comprises a casing unit 3 which has an external casing tube 31, an intermediate casing tube 32, and an internal casing tube 33. The casing tubes 31, 32 and 33 are disposed coaxially so as to be telescopically displaceable inside one another in the longitudinal direction, this corresponding to the axial direction of the longitudinal axis L, as is indicated by a double arrow.

A steering spindle 4 which at the rear end thereof has a connector portion 41 for attaching a steering wheel, not illustrated, is mounted so as to be rotatable about the longitudinal axis L in the casing unit 3.

The casing unit 3 is held in a two-part support unit 2 which has fastening means 51 for attaching to a vehicle body not illustrated.

An adjustment drive 6 for the longitudinal adjustment, also referred to as a longitudinal adjustment drive, has a spindle drive having a spindle nut 66 and a threaded spindle 62 which is screwed into the latter, the spindle nut 66 and the threaded spindle 62 being able to be rotatingly driven relative to one another by an electric motor 63. The threaded spindle 62 by way of the spindle axis S thereof extends parallel to the longitudinal axis L and by way of a connection element configured as a clevis 621 is connected to the internal casing tube 33, and axially supported, that is to say supported in the direction of the spindle axis S. The spindle nut 66 by way of the adjustment drive 6 is likewise axially supported in the longitudinal direction, the latter corresponding to the axial direction of the longitudinal axis L, on the external casing tube 31, wherein the external casing tube 31 has a fork portion, and wherein the adjustment drive 6 can be coupled to the fork portion by way of an intervening, damping rubber element configured as a silent bush. Depending on the rotating direction, the threaded spindle 62 and the spindle nut 66 are converged or diverged by a relative rotation by means of the motor 63, as a result of which the internal casing tube 33 in the axial direction is driven into the external casing tube 31 or driven out of the latter, as is indicated by the double arrow. As a result, a longitudinal adjustment by way of which a steering wheel attached to the connector portion 41 can be moved toward the front, to the left in the illustration in FIG. 1, to a stowage position in which the internal casing tube 33 and the intermediate casing tube 32 are retracted in the external casing tube 31, that is to say inserted thereinto toward the front, or to an operating position in the operating region in which the casing tubes 31, 32 and 33 are diverged, is realized.

Alternatively, the spindle nut 66 can be supported on the internal casing tube 33, and the threaded spindle 62 can be supported on the external casing tube 31.

Figure 2:
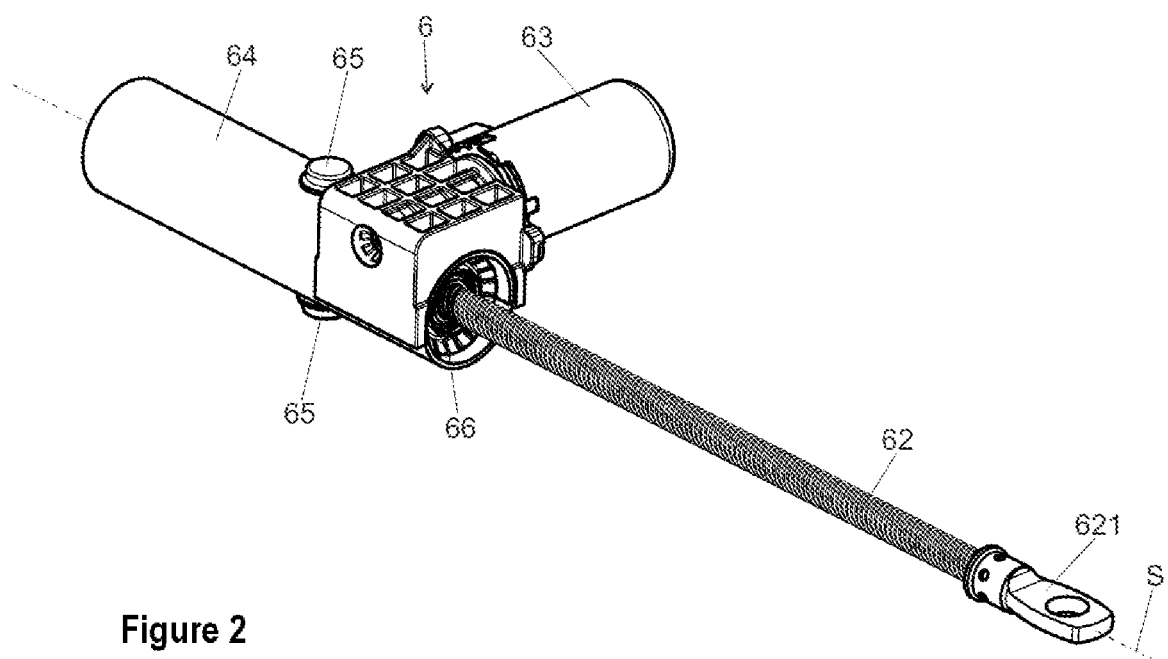
FIG. 2 is a stand-alone perspective view of an example adjustment drive of a steering column according to FIG. 1.

FIG. 2 shows the adjustment drive 6 in a stand-alone separate view. The drive unit of the adjustment drive 6 has a tubular housing 64 having a circular cross section, said housing 64 by way of the interior space thereof extending coaxially with the spindle axis S. The motor 63 is flange-fitted to the housing 64. The housing 64 has stud-shaped connection elements 65 which in the example shown project radially outward and are preferably integrally molded in the housing 64 such that said connection elements 65 project radially outward. Said connection element 65 are able to be connected with corresponding connection means on the external casing tube 31, and in axial terms preferably supported in the direction of the spindle axis S on said connection means in a form-fitting manner.

Figure 3:
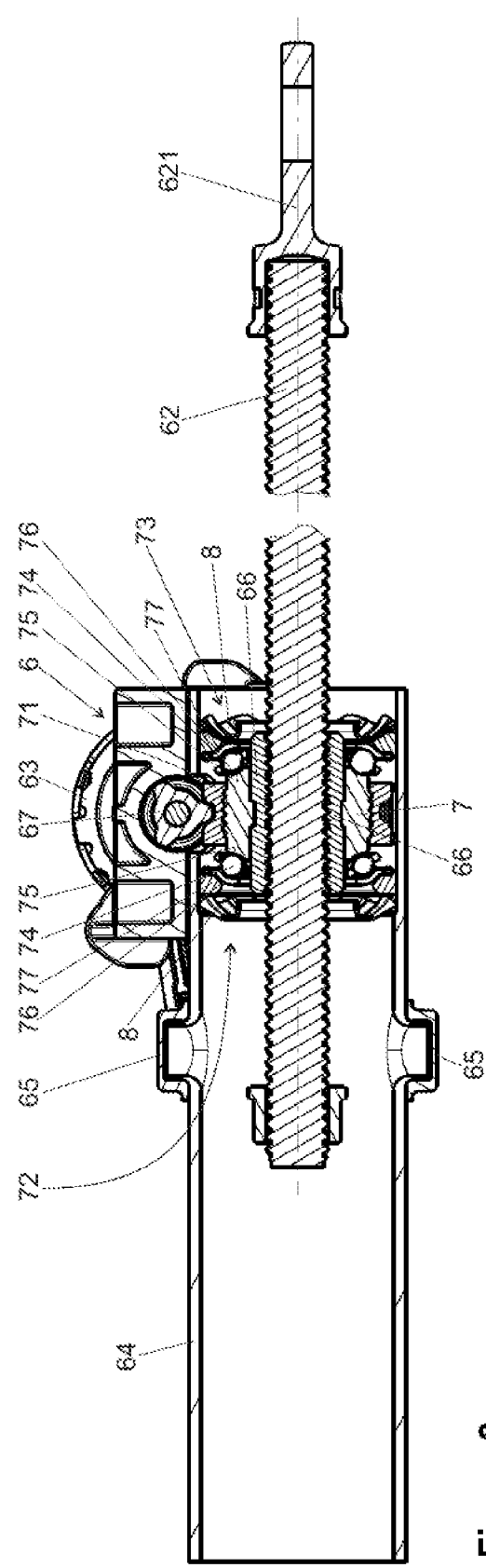
FIG. 3 is a longitudinal sectional view through the adjustment drive according to FIG. 2 in a normal operating state.

FIG. 3 shows a longitudinal section along the spindle axis S through the adjustment drive 6 in the normal operating state. The threaded spindle 62 engages in a spindle nut 66 which is connected in a rotationally fixed manner to a gear wheel 7 so as to be coaxial with the latter. The gear wheel 7 in the example shown is a worm gear with an externally encircling toothing 71 configured as a worm splining, a worm 67 meshing with the latter, said worm 67 by the motor 63 being able to be rotatably driven about a worm axis which is transverse to the spindle axis S and in the present view perpendicular to the section plane.

The gear wheel 7 in the housing 64 is mounted in bearing assemblies 72 and 73 so as to be rotatable about the spindle axis S, said bearing assemblies 72 and 73 being in each case disposed at axial and sides and in the example shown are both configured as roller bearings, specifically as angular ball bearings, having balls 74 which on both sides on the gear wheel 6 roll on encircling rolling member raceways 75 which are mutually oblique. The housing-proximal first bearing assembly 72, on the left in the drawing, has a bearing ring 76 which has a rolling member raceway 75 which lies obliquely opposite the rolling member raceway and corresponds to the latter. The bearing ring 76, so as to be axially directed away from the gear wheel 7, in the drawing to the left, by way of a thrust bearing ring 77 is supported in relation to a retaining ring 8 which forms a retaining element and is braced in the housing 64.

The spindle-proximal second bearing assembly 73, on the right in the drawing, can in principle be constructed so as to be mirror-symmetrical to the first bearing assembly 72 in terms of a mirror plane running through the gear wheel 7 so as to be perpendicular to the spindle axis S. This second bearing assembly 73 likewise has a bearing ring 76 which has a rolling member raceway 75 which is obliquely opposite the rolling member raceway and corresponds to the latter. The second bearing ring 76, in a manner directed axially away from the gear wheel 7, in the drawing to the right, by way of a second thrust bearing ring 77 is supported in relation to a second retaining ring 8 which is likewise braced in the housing 64. The gear wheel is thus mounted in the housing 64 by means of a so-called X-bearing assembly.

The gear wheel 7 in the normal operating state is rotatably mounted in a defined axial position in the bearing assemblies 72 and 73, said bearing assemblies 72 and 73 being held and supported in the axial direction of the spindle axis S by the retaining rings 8 that are braced in the interior space of the housing 64.

Figure 4:
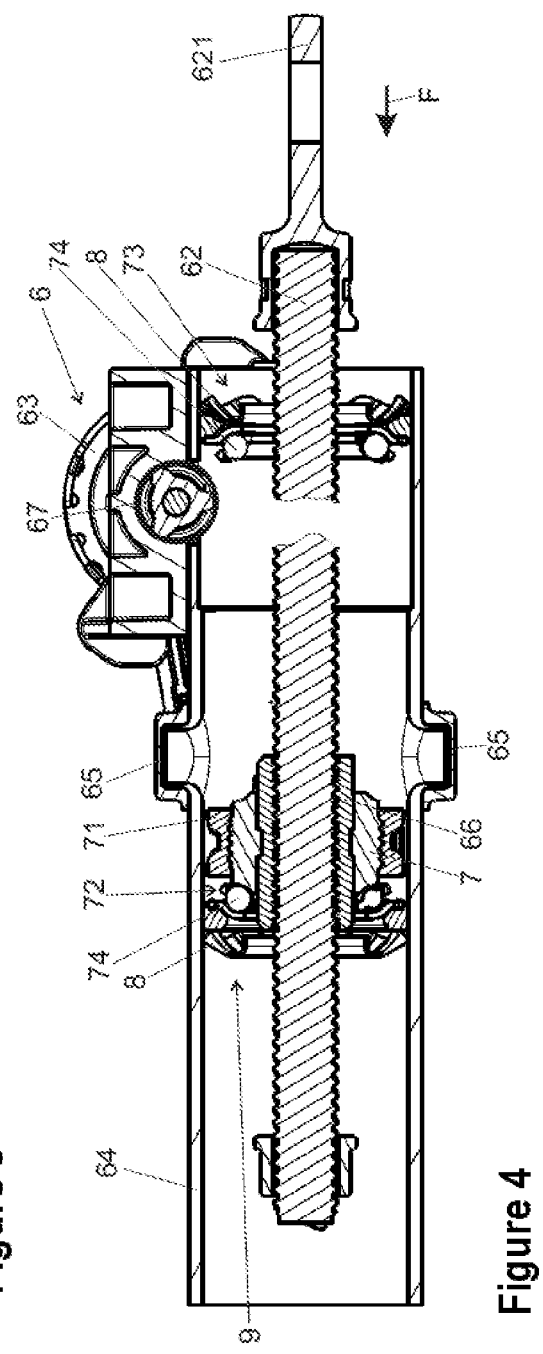
FIG. 4 is a longitudinal sectional view through the adjustment drive according to FIG. 3 after a crash event.

In the event of a crash, a high crash force F, which as is plotted in FIG. 4 is directed from the spindle site to the housing side, to the left in the drawing, acts on the spindle 62 by way of the clevis 621. A high crash force F is understood to mean forces with a value of 1000 N or more. This crash force F is transmitted from the threaded spindle 62 to the gear wheel 7 by way of the spindle nut 66, and from the gear wheel 7 transmitted to the retaining ring 8 by way of the bearing assembly 72. Correspondingly, the crash force F in the axial direction acts counter to the retaining force which as a result of the bracing is generated between the retaining ring 6 and the housing 64. When the crash force F in the event of a crash exceeds this retaining force, the connection is released and the gear wheel 7 conjointly with the threaded spindle 62 including the bearing assembly 72 is moved along the axial direction out of the meshing into the interior space of the housing 64. By virtue of the bracing between the moving retaining ring 8 and the housing 64, a friction force acts here, as a result of which kinetic energy is absorbed and converted into heat such that the threaded spindle 62 is decelerated relative to the housing 64. In this embodiment, an energy-absorbing installation 9 which according to the invention is integrated in the housing 64 of the adjustment drive 6 is formed conjointly by the retaining ring 8 and the housing 54.

The second bearing assembly 73 remains in the original position thereof in the housing, as can be seen in FIG. 4. The worm 67 is no longer operatively connected to the gear wheel 7 such that said worm 67 and said gear wheel 7 are decoupled. The thread between the spindle nut 66 and the threaded spindle 62 is conceived in such a manner that a self-locking action is present between the spindle nut 66 and the threaded spindle 62 such that it is effectively prevented that the threaded spindle 62 is forced through the spindle nut 66 and the energy-absorbing installation 9 can thus become effective according to the intended use in the event of a crash.

Figure 5:
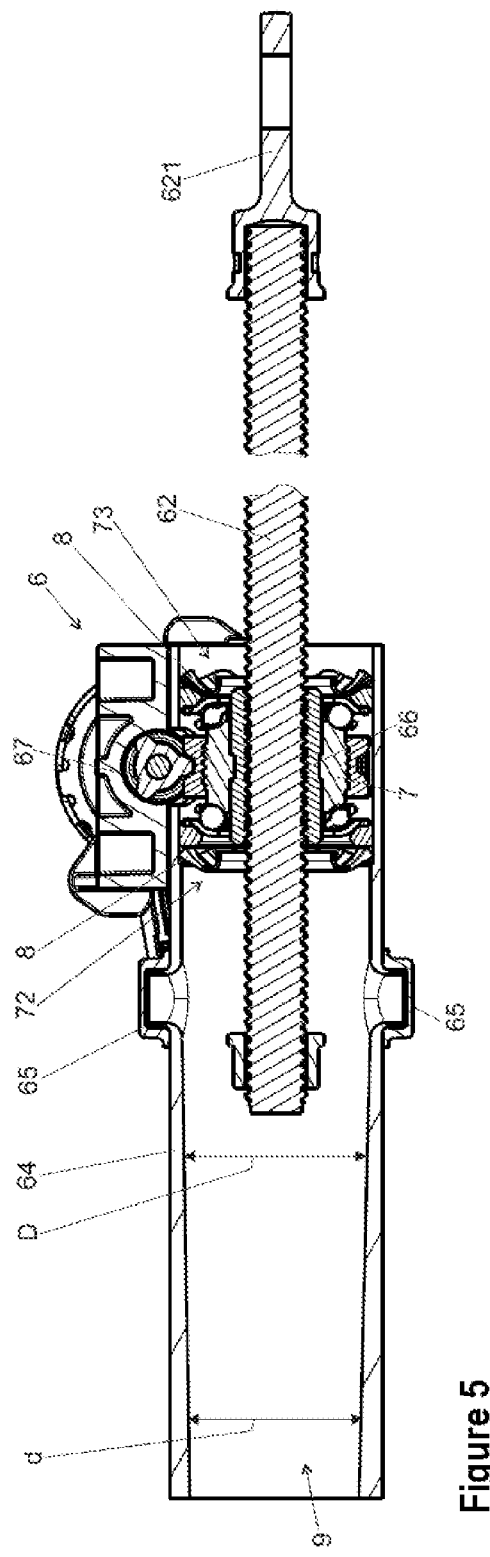
FIG. 5 is a longitudinal sectional view through another example adjustment drive in a normal operating state.

The second embodiment shown in FIG. 5 in a view as in FIG. 3, is additionally distinguished in that the internal cross section of the housing 64, through which the bearing assembly 72 passes in the axial direction in the event of a crash, as is shown in FIG. 4, conically tapers from the spindle side toward the housing side, thus in the direction of the crash force F, in the drawings from right to left. The diameter D in the normal operation here, in the region of the fixing of the bearing assembly 72 is constricted to a smaller final diameter d, in the example shown so as to continuously converge in a conical manner. It is achieved as a result that in the axial displacement to the position shown in FIG. 4 in the event of a crash, the friction between the retaining ring 8 and the housing increases by way of the axial displacement path in the event of a crash, the so-called crash path, as a result of which a progressive energy-absorbing characteristic can be implemented. The reduction of the diameter here can also take place in a discontinuous or irregular manner, respectively, and is not limited to a predetermined shape.

Figure 6:
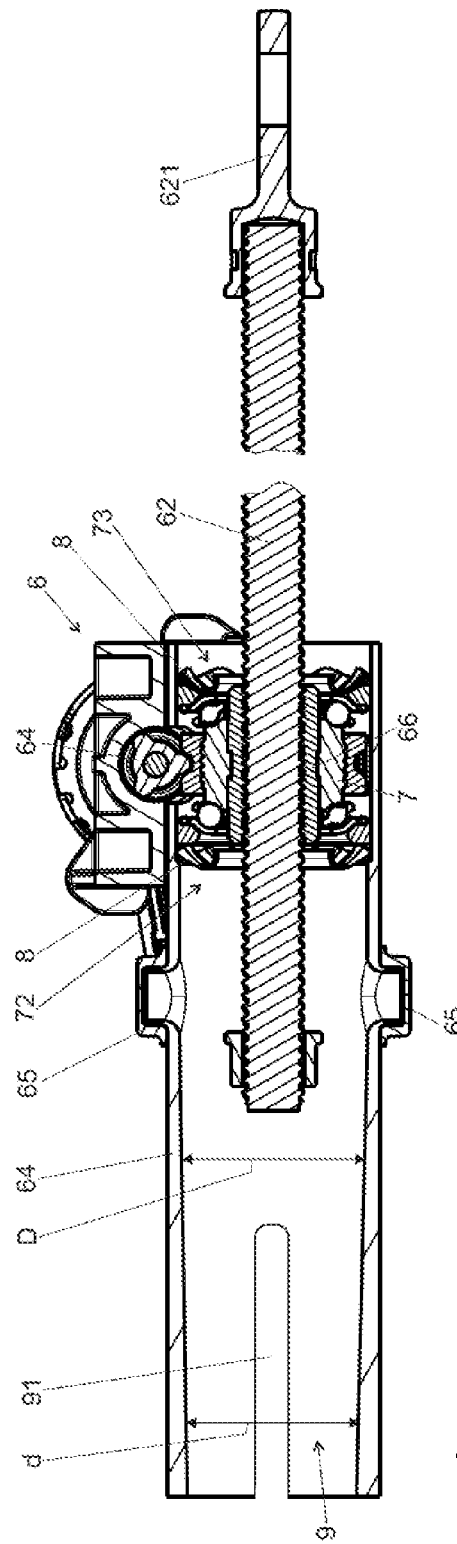
FIG. 6 is a longitudinal sectional view through still another example adjustment drive in a normal operating state.

The third embodiment shown in FIG. 6 is in principle constructed like the aforementioned second embodiment, wherein the tubular housing 64 additionally has a slot 91 which continues across an axial sub-region. The radial stiffness of the housing 64 can be reduced in a defined manner by way of the size, shape and disposal of one or a plurality of slots 91 of this type, so that the effective friction in relation to the retaining ring 8, and as a result thereof the energy-absorbing characteristic, can be predefined. The slot 91 can also be used in housings 64 without a constriction of the diameter; for example, the housing 64 of the first embodiment can also be provided with one or a plurality of slots. Likewise, the shape of the slot 91 is not limited to that shape as illustrated in the third embodiment. The slot 91 can also run in an undulating or a helical manner in the circumferential direction. Furthermore alternatively or additionally to a slot, further cutouts can also be provided in the housing 64.

Figure 7:
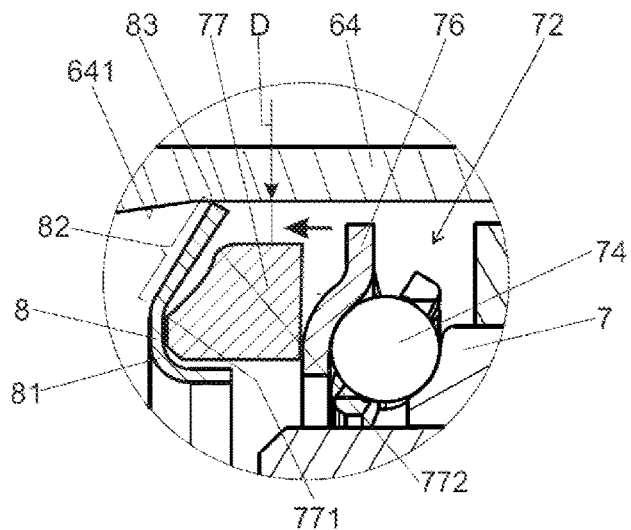
FIG. 7 is a detail view of a longitudinal section through an example energy-absorbing installation of an adjustment drive in a normal operating state.
Figure 8:
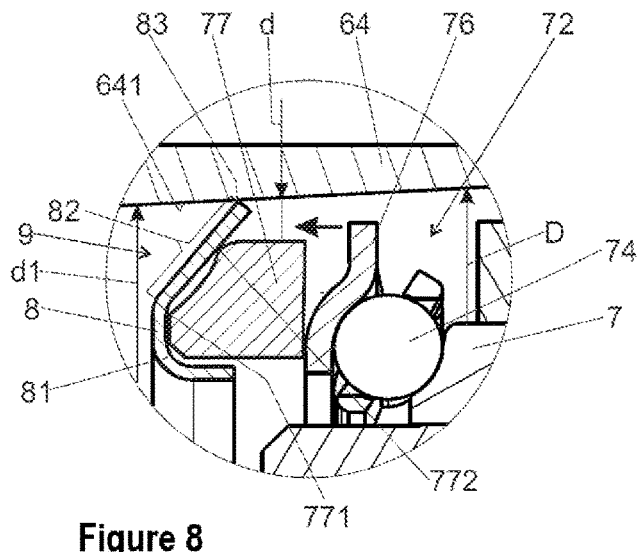
FIG. 8 is a detail view of the energy-absorbing installation of FIG. 7 during a crash event.
Figure 9:
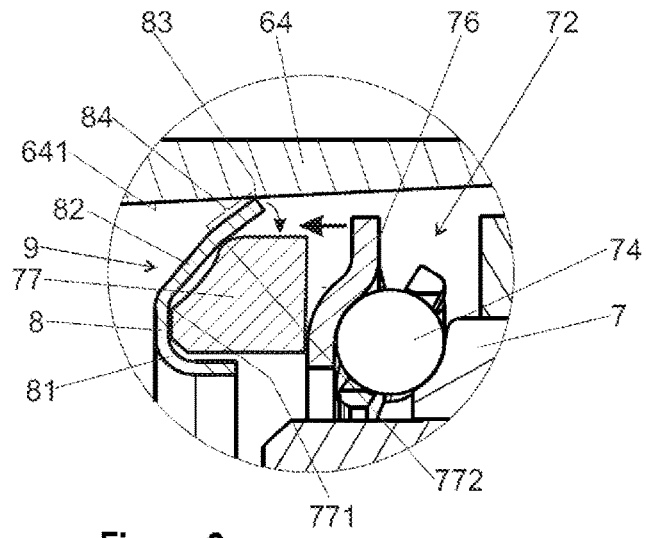
FIG. 9 is a detail view of the energy-absorbing installation of FIGS. 7 and 8 after the crash event.

A refinement of the invention is illustrated in an enlarged sectional view of the bearing assembly 72 in FIGS. 7, 8 and 9, said refinement being in principle implementable in each of the previously explained embodiments, preferably having a conically converging housing 64, as in FIGS. 5 and 6.

The bearing ring 76 on that side thereof that faces the retaining ring 8 is axially supported in relation to the thrust bearing ring 77. The thrust bearing 77 on the end side thereof that faces the retaining ring 8, on the left in the drawings, has a forming die having a first forming element configured as an encircling bending edge 771, and a second forming element likewise configured as an encircling bending edge 772. The bending edge 772 is spaced apart from the bending edge 771 in a radially outward manner, and in an axial manner in the direction toward the gear wheel 7. The retaining ring 8 has a central support ring 81 which bears axially on the thrust bearing ring 77, a retaining portion 82 from said central support ring 81 extending radially outward from the first bending edge 771 so as to be inclined in relation to the spindle axis S. The retaining portion 82 on the outer end thereof has a contact portion 83 which can have a bead which encircles the latter at least in portions, or a retaining edge, for example, said contact portion 83 from the inside bearing on the internal wall 641 of the housing 64 by way of said bead or retaining edge. As a result of the retaining portion 82 potentially being configured as a flexurally elastic flexible tongue, preferably integral to the retaining ring 8 as a stamped-and-bent formed part of spring steel sheet, the contact portion 83 is resiliently preloaded, as a result of which the retaining ring 8 is elastically braced in the housing 64.

In the normal operating state according to FIG. 7, the retaining portion 82, so as to be inclined in relation to the thrust bearing ring 77, extends from the first bending edge 771 up to the housing 64, specifically in a region having the larger diameter D. The second bending edge 772 is not in contact with the retaining ring 8.

FIG. 8 shows the situation in the event of a crash, in which the bearing assembly 72, including the retaining ring 8, in the preferably conically converging housing 64 is axially repositioned in the operative direction of the crash force F into an interior region having a smaller diameter d, as is indicated by the arrow. As a result thereof, the contact portion 83 is pushed radially inward, and the retaining portion 82 is more heavily inclined in relation to the spindle axis S. As a result of the deformation by bending about the first bending edge 771 generated here, the contact portion 83 is elastically tensioned and pushed more firmly against the housing 64, and the friction force increases as a result of which the absorption of energy is increased. The inclination increases until the retaining portion 82 contacts the second bending edge 772. As a result thereof, the effective length of the retaining portion 82 is reduced, and the effective stiffness of the retaining portion 82, the latter still being able to flex, is thus increased, because the shorter the effective length of the retaining portion the stiffer the effective length of the retaining portion.

When the retaining ring 8 is repositioned even further into the conical region during the crash, in the illustration of FIGS. 5 and 6 to the left, the contact portion 83 is pushed even farther radially inward. As a result of the retaining portion 82 already bearing on the second bending edge 772 and as an entity not being able to be inclined farther inward relative to the first bending edge 771, the outer sub-portion 84 of the retaining portion 82, the former extending from the second bending edge 772 up to the contact portion 83, is bent radially inward about the second bending edge 772, as is indicated by the curved arrow. In other words, the retaining portion 62 is bent once again about the second bending edge 772 such that the outer sub-portion 62 is even more inclined in relation to the spindle axis. As a result thereof, the effective elastic length of the flexible tongue forming the retaining portion is reduced, and a result thereof the elastic force of the contact portion 83 in relation to the housing 64 is yet again increased. Accordingly, the absorption of energy is further increased.

A progressively increasing energy-absorbing characteristic can be implemented in this way by the forming die having the bending edges 771 and 772 in interaction with the deformable retaining ring 8, and preferably with the conically converging housing 64.

Figure 10:
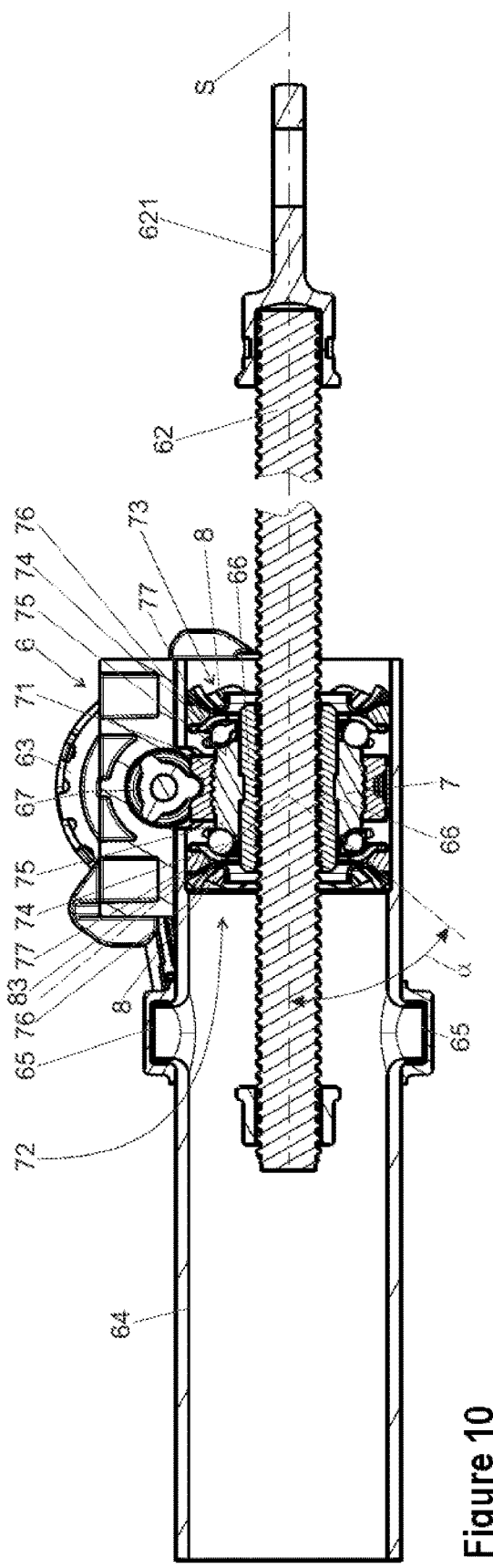
FIG. 10 is a longitudinal sectional view through still another example adjustment drive in a normal operating state.
Figure 11:
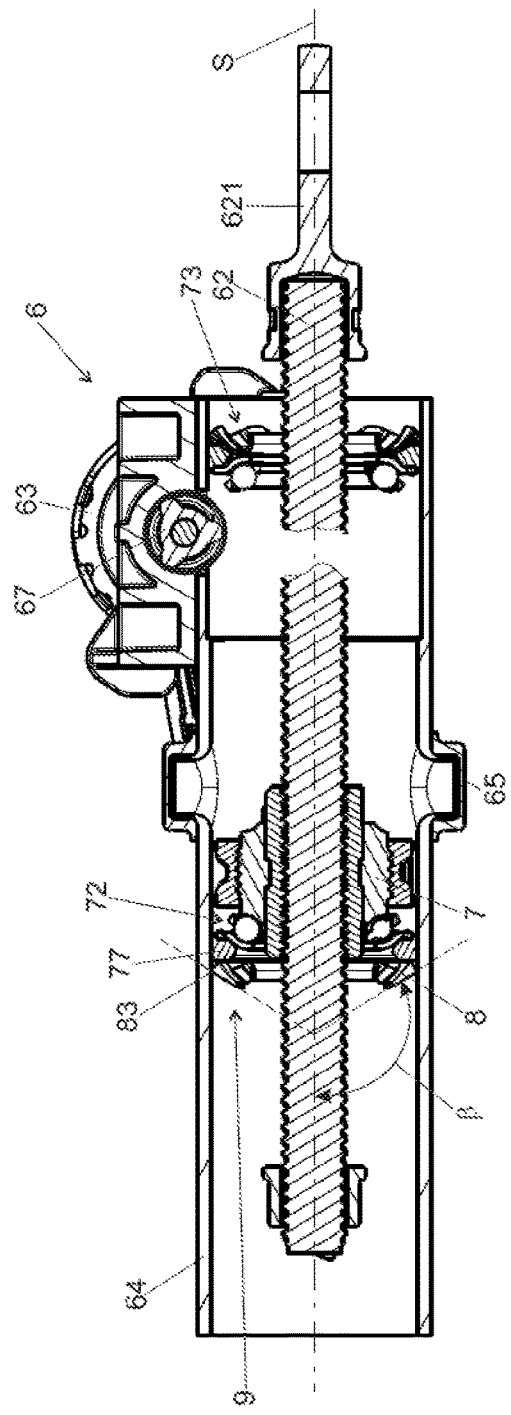
FIG. 11 is a sectional view of an adjustment drive according to FIG. 3 after a crash event.

A further refinement is shown in FIGS. 10 and 11 in the same view as in FIGS. 3 and 4, specifically likewise in the normal operating state and after a crash. In the normal operating state according to FIG. 10, the retaining ring 8 of the bearing assembly 72, at least in the outer peripheral region thereof where said retaining ring 8 by way of the contact portion 83 is braced in relation to the housing 64, has a shape which is inclined away from the thrust bearing ring 77. In other words, the retaining element 8 can comprise a conical annular disk in the shape of a tapered sleeve which, directed away from the trust bearing element 77, conically widens and by way of contact elements 83 of said conical annular disk on the external circumference thereof bears on the internal wall of the tubular housing 64. When viewed from the thrust bearing element 77, the retaining element 8, in the region of a contact portion 83 on the external circumference of said retaining element 8, bears on the housing 64 at an acute angle α, thus α<90°. For improved clarity, α is plotted against the spindle axis S.

When the crash force F exceeds a predefined limit value, the inner region of the retaining ring 8 is pushed in in the axial direction, the direction of the crash force F, through the outer peripheral region supported on the housing 64, such that the conical annular disk of the retaining ring 8 is elastically inverted and the tapered sleeve shape now widens in the axially opposite direction, toward the thrust bearing ring 77, the retaining ring 8 in other words being folded over toward the thrust bearing ring 77. When viewed from the thrust bearing element 77, the retaining ring 8 after folding over, in the region of a contact portion 83 on the external circumference thereof bears on the housing 64 at an obtuse angle β, thus β>90°. As a result thereof, the subsequent relative movement can take place while absorbing energy.

The folding retaining ring 8 forms a threshold switch which releases a relative movement only when a limit value of the force acting thereon is exceeded. Alternatively or additionally, predetermined breaking elements such as shear rivets or the like which break when a force limit value is exceeded and release a relative movement for activating an energy-absorbing installation can.

Figure 12:
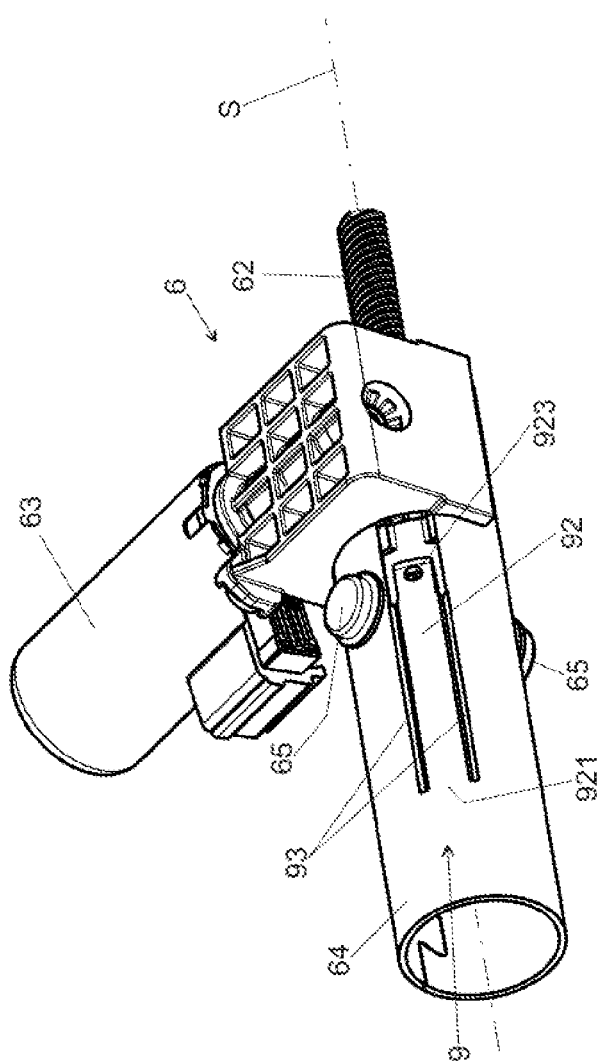
FIG. 12 is a schematic perspective view of a further example adjustment drive.
Figure 13:
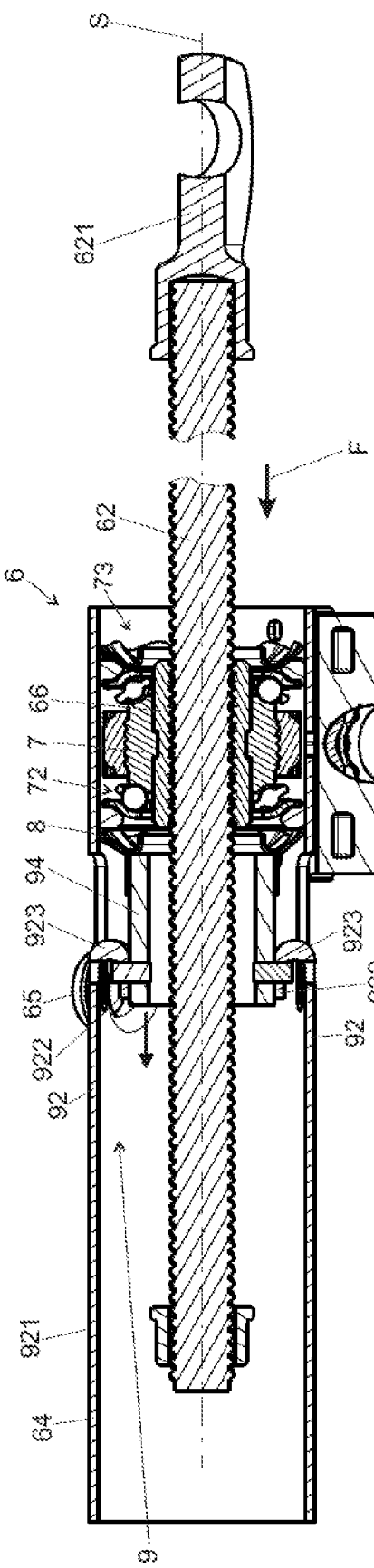
FIG. 13 is a longitudinal sectional view through the adjustment drive according to FIG. 12 in a normal operating state.

FIG. 12 in a perspective view shows a further embodiment of an adjustment drive 6, and FIG. 13 shows a longitudinal section in the normal operating state as in FIG. 3.

The energy-absorbing installation 9 as energy-absorbing elements has two bending strips 92 which by way of incorporated longitudinal slots 93 are configured so as to be integral to the wall of the housing 64. Alternatively, an embossing can be provided instead of the longitudinal slots 93, so as to provide a tear-away lug. As can be seen in FIG. 12, the one end 921 of the bending strip 92 transitions integrally to the housing 64, and the bending strip 92 by way of a bend 923 of approximately 180° runs radially into the interior of the housing up to the free second end 922, the latter consequently having substantially the same direction as the first end 921. The free end 922 is connected to a transmission piece 94 which from the outside, on the end side that faces away from the gear wheel, is axially supported in relation to the bearing assembly 72, for example in relation to the retaining ring 8. When a crash force F acts on the threaded spindle 62, the bearing assembly 72 is repositioned in the axial direction in the housing 64, as has been described above. The free end 922 here is entrained by the transmission piece 94 in the direction toward the fixed end 921, and the bending strip 92 is continuously bent about the bend 923. As a result of the deformation work performed here, kinetic energy is absorbed and the threaded spindle 62 is decelerated relative to the housing 64. The coupling between the transmission piece 94 and the free end 922 in a further embodiment can take place by means of a coupling installation which is configured as a pyrotechnic switch, for example, so as to couple or decouple the bending strips such that either one of the bending strips 92, both bending strips 92 or none of the bending strips 92 is deformed in the event of a crash.

Figure 14:
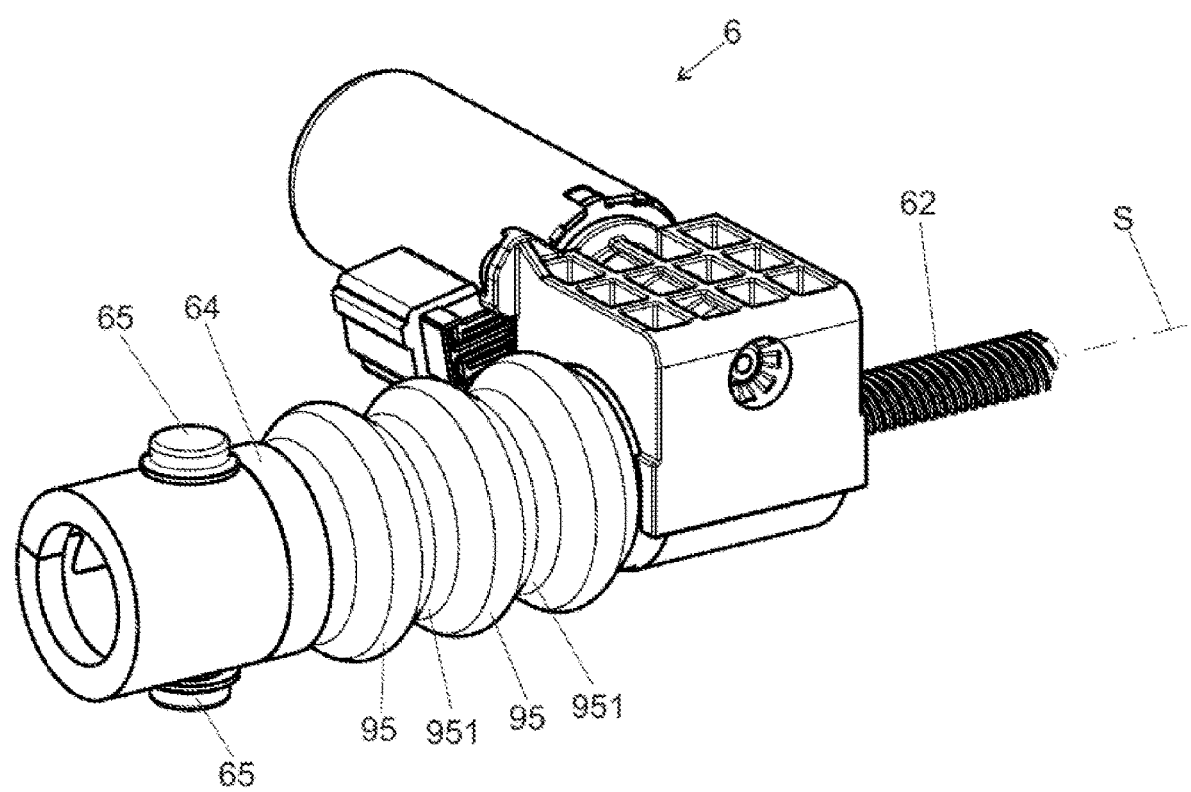
FIG. 14 is a schematic perspective view of yet a further example adjustment drive.
Figure 15:
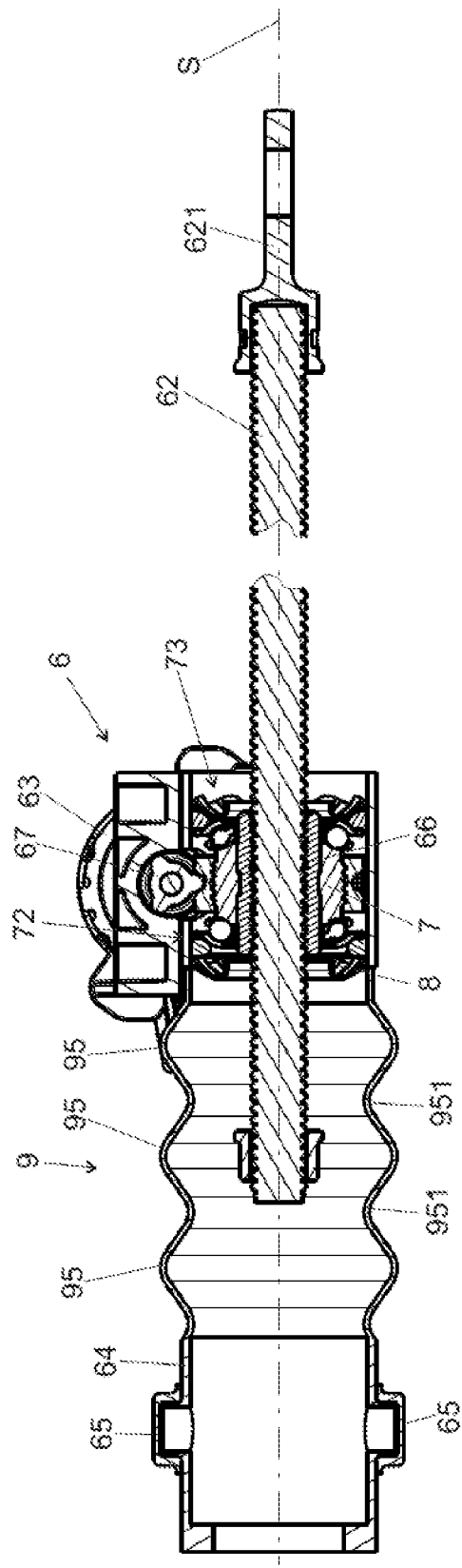
FIG. 15 a longitudinal sectional view through the adjustment drive according to FIG. 14 in a normal operating state.
Figure 16:
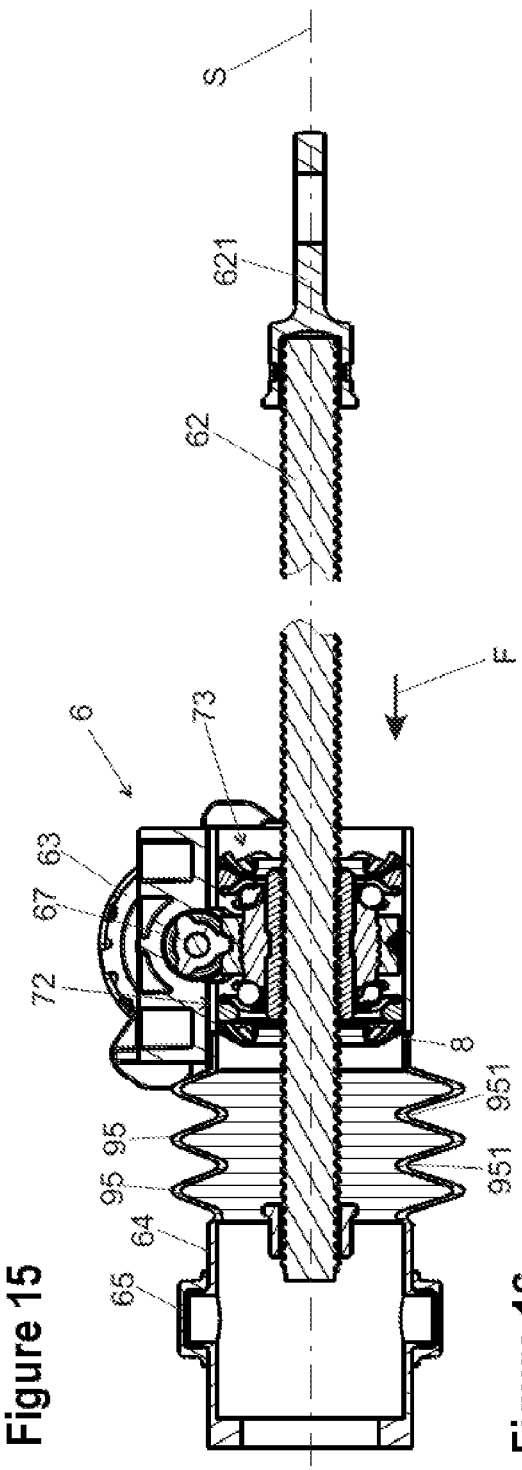
FIG. 16 is a longitudinal sectional view through the adjustment drive according to FIG. 15 after a crash event.

A further embodiment is illustrated in a perspective view in FIG. 14, and in the normal operating state and after a crash illustrated in sectional views in FIGS. 15 and 16 as in FIGS. 3 and 4.

The tubular housing 64 here, in a portion between the connection elements 65 and the gear wheel 7, has a corrugated tube 95 which has a plurality of axially successive, radially molded corrugations 951 which preferably encircle the circumference, said corrugated tube 95 forming an energy-absorbing element. The corrugated tube 95 is disposed so as to be coaxial with the spindle axis S and can be connected to the housing 64, or be configured so as to be integral to the latter. The threaded spindle 62 in axial terms can be at least partially disposed in the corrugated tube 95, as is illustrated.

In the event of a crash, the corrugated tube 95, in the direction of the crash force F acting in this instance, is axially plastically compressed in the direction of the spindle axis S, as is illustrated in FIG. 6, as a result of which kinetic energy is absorbed.

Figure 17:
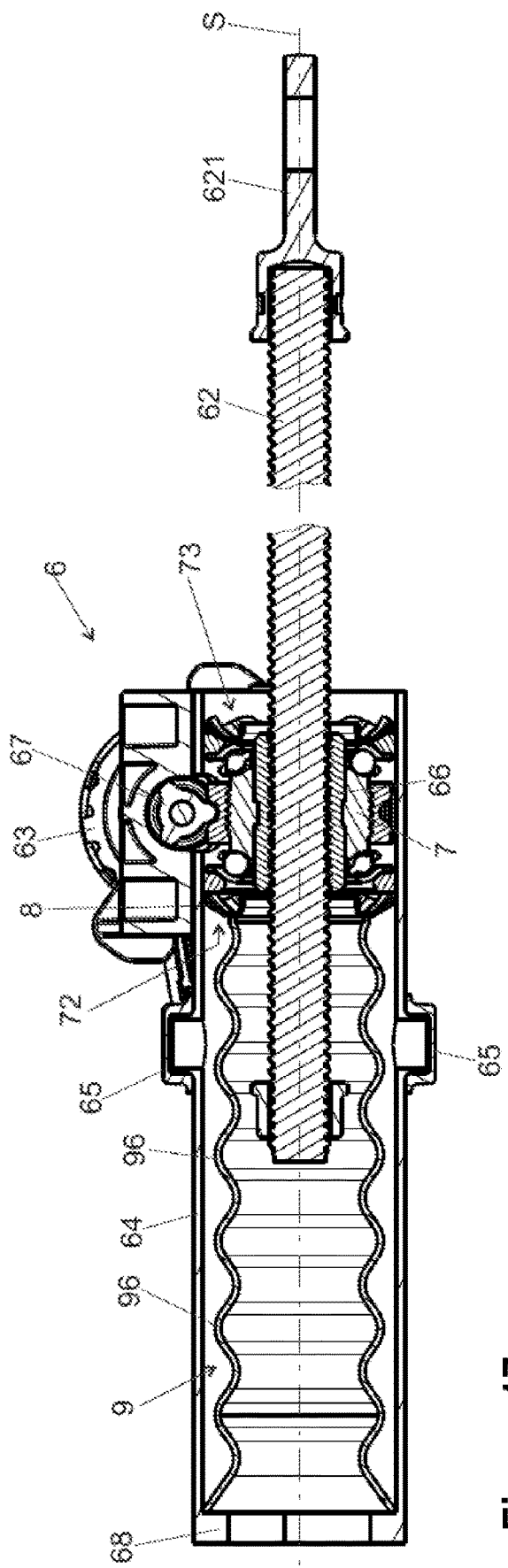
FIG. 17 is a longitudinal sectional view through another example adjustment drive in a normal operating state.

FIG. 17 in a sectional view as in FIG. 3 shows a further embodiment. Like the embodiment shown in FIGS. 3 and 4, this further embodiment has a tubular housing 64. A corrugated tube 96 which has a multiplicity of encircling corrugations and is supported between the bearing assembly 72 and an axial thrust bearing 68 on that end of the housing 64 that faces away from the bearing assembly 72 is disposed as an energy-absorbing element in the housing 64. In the event of a crash, the bearing assembly 72 is moved in the direction toward that end of the housing 64 that faces away from the bearing assembly 72, as is shown in FIG. 4, as a result of which the corrugated tube 96 is axially compressed and absorbs kinetic energy. A progressive crash characteristic can be implemented in that the compressed corrugated tube 96 radially bears on the internal wall of the housing 64, this during further compression thus leading to an increase in terms of the crash force.

The energy-absorbing installations 9 shown in FIGS. 12 to 17 can be combined with one another and also combined with the energy-absorbing installations 9 according to FIGS. 3 to 11, the latter being implemented by the retaining ring 8. A folding retaining ring 8 according to FIGS. 10 and 11 as a trigger installation for activating an energy-absorbing installation 9 can be combined with all of the other embodiments.

LIST OF REFERENCE SIGNS

1 Steering column
2 Actuator unit
3 Casing unit
31 External casing tube
32 Intermediate casing tube
33 Internal casing tube
34, 35 Detent
4 Steering spindle
41 Connector portion
5 Support unit
51 Fastening means
6 Adjustment drive
62 Threaded spindle
621 Clevis
63 Motor
64 Housing
65 Connection element
66 Spindle nut
67 Worm
68 Thrust bearing
7 Gear wheel
71 Toothing
72, 73 Bearing assembly
74 Balls
75 Rolling member raceway
76 Bearing ring
77 Thrust bearing ring
771 Bending edge
772 Bending edge
8 Retaining ring
81 Support ring
82 Retaining portion
83 Contact portion
84 Sub-portion
9 Energy-absorbing installation
91 Slot
92 Bending strip
921 First end
922 Second end
923 Bend
93 Longitudinal slots
94 Transmission piece
95 Corrugated tube
96 Corrugated tube
L Longitudinal axis
S Spindle axis
F Crash force

What is claimed is:

1. An adjustment drive for a steering column for a motor vehicle, comprising:
a housing that is connectable to the steering column;

a gear wheel that is configured to be rotatably driven by a motor about a spindle axis, the gear wheel being mounted in a bearing assembly in the housing;

a threaded spindle that engages in a spindle nut and is axially supported by or in the housing in a direction of the spindle axis;

a retaining element disposed between a thrust bearing element of the bearing assembly and the housing, wherein the thrust bearing element includes a forming die that interacts with the retaining element and includes a forming portion; and an energy-absorbing installation disposed between the threaded spindle and the housing, wherein the energy-absorbing installation is configured to absorb kinetic energy when the threaded spindle is repositioned relative to the housing in the direction of the spindle axis.

2. The adjustment drive of claim 1 wherein the energy-absorbing installation includes an energy-absorbing element.

3. The adjustment drive of claim 1 wherein the energy-absorbing installation is configured to interact with the bearing assembly and the housing.

4. The adjustment drive of claim 1 wherein the housing is configured to be tubular in the direction of the spindle axis, wherein the bearing assembly is received coaxially in the housing.

5. The adjustment drive of claim 1 wherein the retaining element includes an energy-absorbing element.

6. The adjustment drive of claim 1 wherein the retaining element has a contact portion that is braced relative to the housing.

7. The adjustment drive of claim 1 wherein the forming portion is a first forming portion, the thrust bearing element including a second forming portion that is spaced apart from the first forming portion, wherein the first and second forming portions are configured such that the retaining element, upon a first forming about the first forming portion, is configured to be formed in a second forming about the second forming portion.

8. The adjustment drive of claim 7 wherein the retaining element includes a retaining portion that is inclined relative to the thrust bearing element and extends from the first forming portion up to a contact portion of the retaining element that is braced relative to the housing, wherein the retaining portion includes a sub-portion that is configured to be formed about the second forming portion relative to the thrust bearing element so as to extend in a more inclined manner from the second forming portion up to the contact portion.

9. The adjustment drive of claim 7 wherein the retaining element is configured as a retaining ring, wherein the thrust bearing element is configured as a thrust bearing ring, wherein the first forming portion and the second forming portion include bending edges that are encircling in a circumferential direction and are directed toward the retaining ring.

10. The adjustment drive of claim 1 wherein the gear wheel is connected in a rotationally fixed manner to the spindle nut or in a rotationally fixed manner to the threaded spindle.

11. The adjustment drive of claim 1 comprising a predetermined breaking element disposed between the threaded spindle and the housing.

12. A steering column comprising:

a first steering column component and a second steering column component that are adjustable relative to one another in a direction of a spindle axis; and the adjustment drive of claim 1, wherein the adjustment drive includes the housing that by way of a connection means is attachable to the first steering column component and is supportable in the direction of the spindle axis, wherein the threaded spindle of the adjustment drive is supported on the housing in the direction of the spindle axis, the threaded spindle being attachable to the second steering column component and supportable in the direction of the spindle axis.

13. The steering column of claim 12 wherein the first and second steering column components comprise at least three casing tubes that are adjustable relative to one another in a direction of a steering column axis.

14. An adjustment drive for a steering column for a motor vehicle, comprising:

a housing that is connectable to the steering column;

a gear wheel that is configured to be rotatably driven by a motor about a spindle axis, the gear wheel being mounted in a bearing assembly in the housing;

a threaded spindle that engages in a spindle nut and is axially supported by or in the housing in a direction of the spindle axis; and an energy-absorbing installation disposed between the threaded spindle and the housing, wherein the energy-absorbing installation is configured to absorb kinetic energy when the threaded spindle is repositioned relative to the housing in the direction of the spindle axis, wherein the housing includes at least one of:

an internal cross section that converges so as to taper in the direction of the spindle axis;

a slot that extends in the direction of the spindle axis; or a partial variation in terms of wall thickness.

15. An adjustment drive for a steering column for a motor vehicle, comprising:

a housing that is connectable to the steering column;

a gear wheel that is configured to be rotatably driven by a motor about a spindle axis, the gear wheel being mounted in a bearing assembly in the housing;

a threaded spindle that engages in a spindle nut and is axially supported by or in the housing in a direction of the spindle axis; and an energy-absorbing installation disposed between the threaded spindle and the housing, wherein the energy-absorbing installation is configured to absorb kinetic energy when the threaded spindle is repositioned relative to the housing in the direction of the spindle axis, wherein the energy-absorbing installation includes a bending lug or a tear-away lug.

16. An adjustment drive for a steering column for a motor vehicle, comprising:

a housing that is connectable to the steering column;

a gear wheel that is configured to be rotatably driven by a motor about a spindle axis, the gear wheel being mounted in a bearing assembly in the housing;

a threaded spindle that engages in a spindle nut and is axially supported by or in the housing in a direction of the spindle axis; and an energy-absorbing installation disposed between the threaded spindle and the housing, wherein the energy-absorbing installation is configured to absorb kinetic energy when the threaded spindle is repositioned relative to the housing in the direction of the spindle axis, wherein the energy-absorbing installation includes a hollow member that is coaxial with the spindle axis and is plastically compressible axially in the direction of the spindle axis.

17. An adjustment drive for a steering column for a motor vehicle, comprising:
- a housing that is connectable to the steering column;
- a gear wheel that is configured to be rotatably driven by a motor about a spindle axis, the gear wheel being mounted in a bearing assembly in the housing;
- a threaded spindle that engages in a spindle nut and is axially supported by or in the housing in a direction of the spindle axis; and
- an energy-absorbing installation disposed between the threaded spindle and the housing, wherein the energy-absorbing installation is configured to absorb kinetic energy when the threaded spindle is repositioned relative to the housing in the direction of the spindle axis,
- wherein the housing includes a hollow member that is coaxial with the spindle axis and is plastically compressible axially in the direction of the spindle axis.

* * * * *